Oct. 28, 1958  S. BLAKE  2,857,686
ABACUS
Filed Oct. 24, 1956
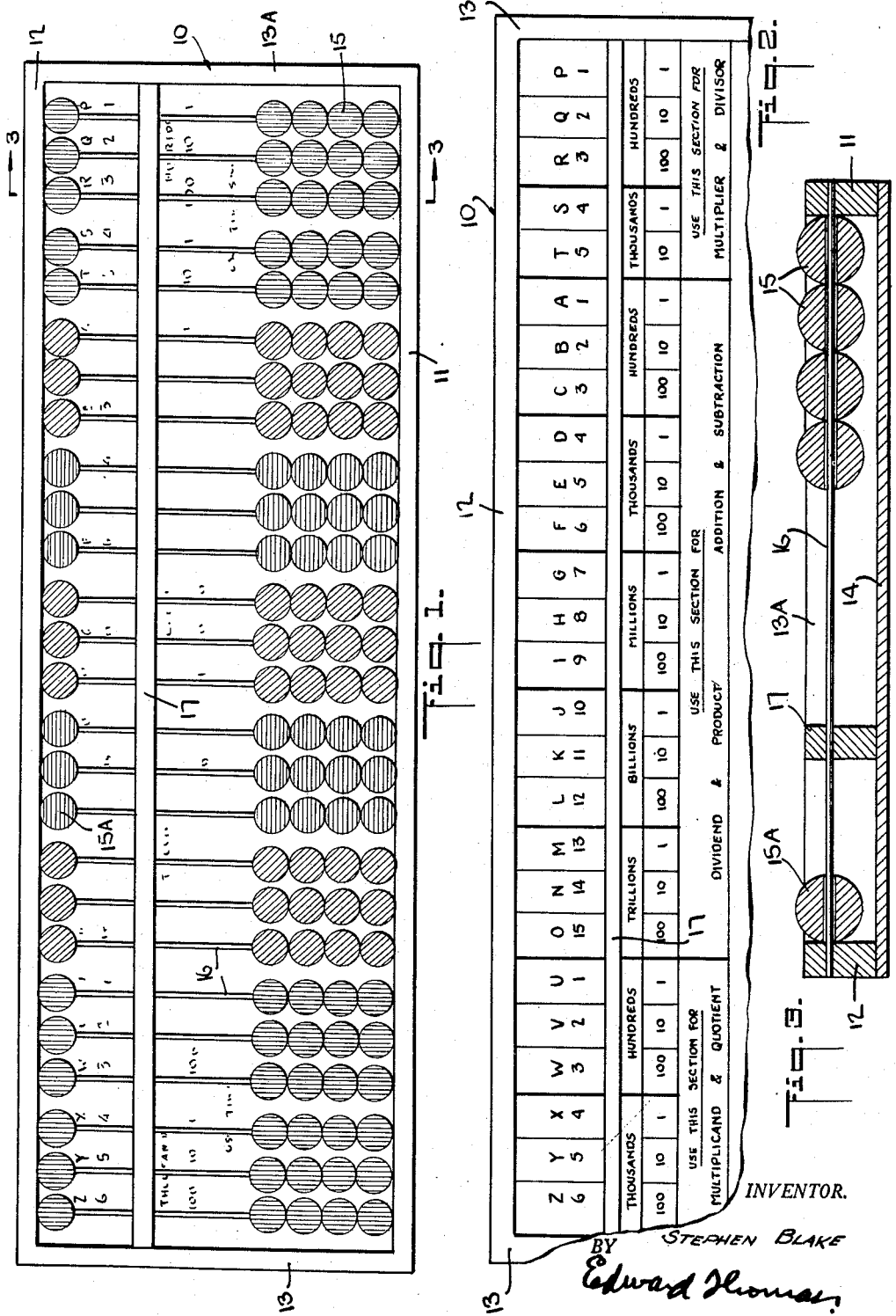
INVENTOR.
Stephen Blake
BY Edward Thomas
ATTORNEY

United States Patent Office 2,857,686
Patented Oct. 28, 1958

2,857,686

ABACUS

Stephen Blake, New York, N. Y.

Application October 24, 1956, Serial No. 618,137

3 Claims. (Cl. 35—33)

This invention relates to an abacus and is herein described as embodied in an abacus well adapted for commercial use or for teaching.

Most people do their thinking largely through visual pictures and many others do their thinking through their motor nerve centers. Moreover, the conception of number comes through counting concrete objects.

Children who learn arithmetic through working on an abacus, learn to work with numbers by natural mental pictures and natural motor sensations. Their use of the abacus is independent of the language they speak, thus, they associate the names of digits and numbers in their own language with mental pictures of counters on an abacus and with the motions to move those counters.

Arithmetic is usually taught through the writing down of digits, but a written down digit really is only a conventional symbol set down to represent a mental abstraction, and a written digit is a wholly arbitrary conventional symbol and is for many minds connected only indirectly with a mental visually pictured number.

The abacus sometimes used in teaching arithmetic often has ten counters on each of several rods, but the human eye does not readily grasp an image of "ten counters," and so it comes about that abacus is little used by teachers.

The abacus used in many commercial organizations, especially in China, provides counters on rods, usually five counters, and further provides extensions of the rods above a partition, each extension carrying two counters. Tests of speed of accurate computations on such an abacus are reported to have shown that the skilled operator of the abacus achieved results as rapidly as the operator of a commercial American adding machine.

Other forms of abacus have been used, some dating from prehistoric times.

The abacus of the present invention is shown with simpler groups in that the rods carry only four counters on one side of the partition and one counter on the other side of the partition, and with counter space on each rod to permit of counter movement, so the mind never has to grasp a picture of more than five counters, and usually of four or fewer counters.

In the form shown the abacus carries rods and counters thereon set apart in groups especially adapted for multiplication and division in addition to the groups usually utilized for addition and subtraction.

To attain the foregoing and other ends more readily, the abacus is shown as part of a shallow box in which the ends of the abacus rods are carried by the long sides and in which the box bottom carries beneath the groups of counters a printed chart naming the functions of each group of counters immediately above the chart divisions, such as addition, subtraction, multiplication and division, and their respective factors.

This chart facilitates the learning of the layout of the counters since its divisions coincide with the counter groups and thus lays a basis for practice by finger and thumb leading to sub-conscious manipulation of the counters in computing.

Moreover, in the form shown the counters used for addition and subtraction are shown as carried on rods spaced from each other to point off thousands, millions, and other groups of digits, and the counters used for multiplication and division are shown at one end of the abacus on similarly spaced rods and shown at the other end of the abacus on similarly spaced rods.

Moreover, adjacent groups of counters on those rods are shown of contrasting colors to additionally keep in the user's mind the work in hand.

Other features and advantages will hereafter appear.

In the accompanying drawing:

Fig. 1 shows an elaborate form of the abacus as seen from above ready for use;

Fig. 2 shows the chart background to fit the aforegoing;

Fig. 3 shows a section on the line 3—3 of Fig. 1.

In the form illustrated the abacus parts are contained in a shallow box 10 having a front wall 11 and a rear wall 12, joined at the ends by side walls 13 and 13A and rising from the bottom 14.

In the form shown the moveable counters 15 and 15A are carried on rods 16 which are supported at their ends by the front wall 11 and the rear wall 12.

The rods 16, about one-third of their length from the rear wall 12 pass through a secondary wall or reading bar 17, separating the counters so that when an arithmetical operation is begun, four counters 15 on one side of the reading bar 17 on each rod 16 lie against the front wall 11, and the other counter 15A on each rod 16 lies against the rear wall 12.

For ease of operation sub-consciously, the twenty-six rods shown are set apart in groups, and are lettered from A to Z.

In the grouping shown, which is capable of handling all numbers likely to turn up in commercial work, the group of rods 16 carrying counters for addition and subtraction are lettered from A through O on a chart below the rods usually cemented on the inside bottom of the box 10 and divided by ruled lines lying beneath the spaces between the rows of counters.

The rods 16, as shown at A, B, C, are spaced to carry their counters near each other, but the rod 16 at D is spaced further from the rod 16 at C, corresponding to the writing of digits "pointed off" at thousands.

Then the rods 16 at D, E, F, are spaced as the rods 16 at A, B, C, and the rod 16 at G spaced from the rod 16 at F, as the rod 16 at D is spaced from the rod 16 at C.

Then the rods 16 at G, H, I, are spaced as the rods 16 at A, B, C, and the rod 16 at J spaced from the rod 16 at I, as the rod 16 at D is spaced from the rod 16 at C.

Then the rods 16 at J, K, L, are spaced as the rods 16 at A, B, C, and the rod 16 at M spaced from the rod 16 at L, as the rod 16 at D is spaced from the rod 16 at C.

Then the rods 16 at M, N, O, are spaced as the rods 16 at A, B, C.

In an abacus for elementary teaching, some rods 16 such as at L, M, N, O, are often omitted, to render the device more easily grasped by the immature mind.

The foregoing spacing of rods 16 with their counters 15 provides an aid to a "touch system" of operating the abacus counters 15. To facilitate visual operation of the counters 15, the different groups of denominations of numbers may be differently colored. Thus the counters 15 on rods 16 at A, B, C, may be green, the counters 15 on rods 16 at D, E, F, may be deep blue, the counters 15 on rods 16 at G, H, I, may be green, the counters 15 on rods 16 at J, K, L, may be deep blue, and the counters 15 on rods 16 at M, N, O, may be green, thus effectively pointing off numbers to trillions, if an abacus of that range is desired.

The present abacus simplifies the eye picture and the motor operations, each of the four counters 15 between the front wall 11 and the reading bar 17 represents one unit when pushed until arrested by the reading bar 17. The single counter 15A between the rear wall 12 and the reading bar 17 represents "five" units or the digit 5, when it is moved down until arrested by the reading bar 17. Thus all counters 15 shown on rods 16 in Fig. 1 stand at zero.

To add the number 27 to the number 46, two counters 15 on rod 16 at B are pushed up from the front wall 11 to the reading bar 17, to denote the 2 of the number 27. Then the one counter 15A against the rear wall 12 on the rod 16 at A is moved down from the rear wall 12 to the reading bar 17, and two counters 15 against the front wall on the rod 16 at A are pushed up to the reading bar 17, (5 plus 2) to denote the 7 of the number 27. See illustration.

| C | B | A |
|---|---|---|
| o |   | o |
|   |   |   |
|   |   | o |
|   | o | o |
|   | o | o |
| o |   |   |
| o |   |   |
| o | o | o |
| o | o | o |
| 0 | 2 | 7 |

Then the digit 4 is added to the digit 2 by moving down the one counter 15A on the rod 16 at B from the rear wall 12 to the reading bar 17, and pushing down one counter 15 on the rod 16 at B from the reading bar 17 to the front wall 11, so the counters on rod 16 at B denote the digit 6. See illustration.

| C | B | A |
|---|---|---|
| o |   |   |
|   |   |   |
|   | o | o |
|   | o | o |
|   |   | o |
| o |   |   |
| o | o |   |
| o | o | o |
| o | o | o |
| 0 | 6 | 7 |

To add the 6 to the 7 which totals 13. The digit 6 on the abacus is denoted by 5 plus 1, therefore, one counter 15 on rod 16 at A is pushed up from the front wall 11 to the reading bar 17, and the one counter 15A on the rod 16 at A is moved up from the reading bar 17 to the rear wall 12, and to denote the digit 1 of the 13, one counter 15 on rod 16 at B is pushed up from the front wall 11, to the reading bar 17, so that rod 16 at B denotes 7 and rod 16 at A denotes 3, the correct answer 73. See illustration.

| C | B | A |
|---|---|---|
| o |   | o |
|   | o |   |
|   | o | o |
|   | o | o |
|   |   | o |
| o |   |   |
| o |   |   |
| o | o | o |
| o | o | o |
| 0 | 7 | 3 |

In other words, numbers are read from counters at the reading bar 17, single units on one side and a five on the other side of the reading bar 17. It is found that a person familiar with the movement of counters for the addition of numbers can operate them and obtain a result from the counters more rapidly than he can add and write down the total digit by digit from right to left. Counters are moved in the order numbers are denoted on the abacus from left to right, the normal way numbers are written and read, and its operation becomes subconscious, once the counter movements are learned.

Larger numbers are equally easily handled, by the same type of steps, digit by digit from left to right. Subtraction may seem obvious, but any needed instructions are included in the explanation of division given below. Multiplication and division are described below.

At the left of rod 16 at O are shown other additional rods 16, U, V, W, X, Y, Z, set off by a wider space at O. These are provided for simplifying the use of the abacus in multiplication and division, but carry counters 15, in shape, use, and individual value, identical with the counters described above. Also in the form of the abacus shown are additional rods 16, P, Q, R, S, T, at the right of rod 16 at A, and set off by a wider space at A. These rods 16 are also used in multiplication and division, and carry counters 15, in shape, use, and individual value identical with the counters described above.

*To multiply 84 by 37*

For the multiplicand, move the one counter 15A on rod 16 at V down from the rear wall 12 to the reading bar 17, and push three counters 15 on rod 16 at V from the front wall 11 to the reading bar 17, to denote digit 8 of the number 84, and then push four counters 15 on rod 16 at U, from the front wall 11 to the reading bar 17, to denote the digit 4 of the number 84. Thus, completing the multiplicand 84. For the multiplier 37, push three counters 15 on rod 16 at Q, from the front wall 11 to the reading bar 17, to denote the digit 3 of the number 37, and then move the one counter 15A on rod 16 at P, down from the rear wall 12 to the reading bar 17, and push two counters 15 on rod 16 at P up from the front wall 11 to the reading bar 17, to denote the digit 7 (5 plus 2) of the number 37. Thus completing the multiplier 37. See illustration showing the pertinent rods 16 with the counters set to show the multiplicand and the multiplier before multiplication of any digits.

| W | V | U | E | D | C | B | A | R | Q | P |
|---|---|---|---|---|---|---|---|---|---|---|
| o |   | o | o | o | o | o | o |   | o | o |
|   | o |   |   |   |   |   |   |   |   | o |
|   | o | o |   |   |   |   |   |   | o | o |
|   | o | o |   |   |   |   |   |   | o | o |
|   | o |   |   |   |   |   |   |   |   | o |
| o |   |   | o | o | o | o | o | o |   |   |
| o |   |   | o | o | o | o | o | o |   |   |
| o |   |   | o | o | o | o | o | o |   | o |
| o | o |   | o | o | o | o | o | o | o | o |
| 0 | 8 | 4 | 0 | 0 | 0 | 0 | 0 | 0 | 3 | 7 |

(1) Multiply the digit 8 on rod 16 at V by the digit 3 on rod 16 at Q and add 24 on rod 16 at C, which entails pushing up two counters 15 on rod 16 at D from the front wall 11 to the reading bar 17, and then pushing up four counters 15 on rod 16 at C, from the front wall 11 to the reading bar 17.

| E | D | C | B | A |
|---|---|---|---|---|
| o | o | o | o | o |
|   |   |   |   |   |
|   | o | o |   |   |
|   | o | o |   |   |
|   |   | o |   |   |
|   |   | o |   |   |
| o |   |   | o | o |
| o |   |   | o | o |
| o | o |   | o | o |
| o | o |   | o | o |
| 0 | 2 | 4 | 0 | 0 |

(2) Multiply the digit 4 on rod 16 at U by the digit 3 on rod 16 at Q and add 12 on rod 16 at B, which entails moving down the one counter 15A on rod 16 at C, from the rear wall 12 to the reading bar 17, and then pushing down four counters 15 on rod 16 at C from the reading bar 17 to the front wall 11, to add the digit 1 of the number 12, and then pushing two counters 15 on rod 16 at B, from the front wall 11 to the reading bar 17.

| E | D | C | B | A |
|---|---|---|---|---|
| o | o |   | o | o |
|   |   | o |   |   |
|   | o | o |   |   |
|   | o |   | o |   |
| o |   | o |   | o |
| o |   | o |   | o |
| o | o | o | o | o |
| o | o |   | o | o |
| 0 | 2 | 5 | 2 | 0 |

(3) Multiply the digit 8 on rod 16 at V by the digit 7 on rod 16 at P, and add 56 on rod 16 at B, which entails moving up the one counter 15A on rod 16 at C from the reading bar 17 to the rear wall 12, and then pushing up one counter 15 on rod 16 at D from the front wall 11 to the reading bar 17, to add the digit 5 of the number 56, and then moving the one counter 15A on rod 16 at B, down from the rear wall 12 to the reading bar 17, and pushing one counter 15 on rod 16 at B up from the front wall 11 to the reading bar 17.

| E | D | C | B | A |
|---|---|---|---|---|
| o | o | o |   | o |
|   |   |   | o |   |
|   | o |   | o |   |
|   | o |   | o |   |
|   | o |   |   |   |
| o | o |   | o | o |
| o | o |   | o | o |
| o | o |   | o | o |
| o | o | o | o | o |
| 0 | 3 | 0 | 8 | 0 |

(4) Multiply the digit 4 on rod 16 at U by the digit 7 on rod 16 at P, and add 28 on rod 16 at A, which entails pushing up one counter 15 on rod 16 at C, from the front wall 11 to the reading bar 17, and then moving the one counter 15A on rod 16 at B, up from the reading bar 17 to the rear wall 12, and pushing three counters 15 on rod 16 at B, down from the reading bar 17 to the front wall 11, to add the digit 2 of the number 28, and then moving the one counter 15A on rod 16 at A, down from the rear wall 12 to the reading bar 17, and pushing three counters 15 on rod 16 at A, up from the front wall 11 to the reading bar 17.

| E | D | C | B | A |
|---|---|---|---|---|
| o | o | o | o |   |
|   |   |   |   | o |
|   | o | o |   | o |
|   | o |   |   | o |
|   | o |   |   | o |
| o |   |   | o |   |
| o |   |   | o |   |
| o |   |   | o |   |
| o | o |   | o | o |
| 0 | 3 | 1 | 0 | 8 |

It will be noted that the numbers are always set up beginning with the left hand digit, so that numbers, unlike ordinary arithmetic, are handled in a natural manner, avoiding the awkward right hand beginning of operations in ordinary arithmetic. The result of the foregoing is summarized on the pertinent rods 16, as illustrated, with the correct product 3,108 as shown, in addition to the multiplicand and the multiplier, on rods 16 at V, U, and Q, P, respectively. It will also be noted that the counters 15, adjacent to and on either side of the reading bar 17 on rods 16, which denote the result of a computation, stand out by themselves and are not likely to be confused with counters 15 on rods 16 that are against the front wall 11 or the rear wall 12, to further simplify operation.

*To divide 6,142 by 74*

For the dividend move the one counter 15A on rod 16 at G down from the rear wall 12 to the reading bar 17, and push one counter 15 on rod 16 at G up from the front wall 11 to the reading bar 17, to set the digit 6 of the number 6,142; then push one counter 15 on rod 16 at F, up from the front wall 11 to the reading bar 17, to set the digit 1; then push four counters 15 on rod 16 at E, up from the front wall 11 to the reading bar 17, to set the digit 4; and push two counters 15 on rod 16 at D up from the front wall 11 to the reading bar 17, to set the digit 2, thus setting the dividend 6,142. It will be noted that the last digit of the dividend is set on rod 16 at D, this is to permit the use of three zeros after the whole number of the dividend, and thus provide for a decimal fraction of at least three digits in the quotient.

| G | F | E | D | C | B | A |
|---|---|---|---|---|---|---|
|   |   | o | o |   | o | o |
| o |   |   |   |   |   |   |
| o |   | o | o |   |   |   |
|   |   |   | o | o |   |   |
|   |   |   | o |   |   |   |
|   |   |   | o |   |   |   |
|   |   |   |   | o | o | o |
| o | o |   |   | o | o | o |
| o | o |   | o | o | o | o |
| o | o |   | o | o | o | o |
| 6 | 1 | 4 | 2 | 0 | 0 | 0 |

For the divisor, move the one counter 15A on rod 16 at Q down from the rear wall 12 to the reading bar 17, and push two counters 15 on rod 16 at Q up from the front wall 11 to the reading bar 17, to set the digit 7, of the divisor 74; then push four counters 15 on rod 16 at P up from the front wall 11 to the reading bar 17, to set the digit 4, and thus complete the divisor 74; as shown in illustration, before any element of division is made.

| G | F | E | D | C | B | A | Q | P |
|---|---|---|---|---|---|---|---|---|
|   |   | o | o |   | o | o |   | o |
| o |   |   |   |   |   |   | o |   |
| o |   | o | o |   |   |   |   | o |
|   |   |   | o | o |   |   |   | o |
|   |   |   | o |   |   |   |   | o |
|   |   |   | o |   |   |   |   | o |
|   |   |   |   | o | o | o |   |   |
| o | o |   |   | o | o | o | o |   |
| o | o |   | o | o | o | o | o |   |
| o | o |   | o | o | o | o |   |   |
| 6 | 1 | 4 | 2 | 0 | 0 | 0 | 7 | 4 |

To obtain the first digit of the quotient, it is necessary to find the number of times the first digit of the divisor can be subtracted from the first or first two digits of the dividend; thus in the above instance, it is noted that the digit 7 on rod 16 at Q, will go into the number 61 on rods 16 at G and F, eight times, and, since the quotient will, therefore, contain two digits in its whole number, move the counter 15A on rod 16 at V down from the rear wall 12 to the reading bar 17, and push three counters 15 on rod 16 at V up from the front wall 11 to the reading bar 17, to set the digit 8 in the quotient section of the abacus. Then subtract 56, eight times seven, from the rod 16 at F, by moving the one counter 15A on rod 16 at G up from the reading bar 17 to the rear wall 12, to subtract the digit 5 of the number 56, then push one counter 15 on rod 16 at G down from the reading bar 17 to the front wall 11, then move the one counter 15A on rod 16 at F down from the rear wall 12 to the reading bar 17, and push one counter 15 on rod 16 at G down from the reading bar 17 to the front wall 11, to subtract the digit 6 from the number 11 remaining after subtracting the digit 5 from the digit 6 on rod 16 at G. Then multiply the digit 4 on rod 16 at P by the digit 8 on rod 16 at V, and subtract 32 on rod 16 at E, by moving the one counter 15A on rod 16 at F up from the reading bar 17 to the rear wall 12, and pushing two counters 15 on rod 16 at F up from the front wall 11 to the reading bar 17, to subtract the digit 3 of the number 32, and then pushing two counters 15 on rod 16 at E down from the reading bar 17 to the front wall 11 to subtract the digit 2 of the number 32.

| VU | G | FED | CBA | QP | VU | G | FED | CBA | QP |
|----|---|-----|-----|----|----|----|-----|-----|----|
| o  | o | o o o | o o o | o | o | o | o o | o o o | o |
| o  |   |       |       | o | o |   | o   |       | o |
| o  | o | o o o |   o o |   | o |   | o o |       | o o |
| o  |   | o o   |   o o |   | o |   | o o |       | o o |
| o  |   | o     |   o   |   | o |   | o   |       | o |
|    |   | o     |       |   |   |   | o   |       |   |
| o  |   |       | o o o |   | o | o | o   | o o o |   |
|    | o o | o     | o o o |   |   | o o | o | o o o |   |
|    | o   | o o   | o o o | o |   | o   | o o | o o o | o |
| o o | o | o o | o o o | o | o o | o | o o | o o o | o |
| 8 0 | 1 | 1 4 2 | 0 0 0 | 7 4 | 8 0 | 0 | 5 4 2 | 0 0 0 | 7 4 |

| VU | G | FED | CBA | QP | VU | G | FED | CBA | QP |
|----|---|-----|-----|----|----|----|-----|-----|----|
| o  | o | o o o | o o o | o | o | o | o o o | o o o | o |
| o  |   |       |       | o | o |   |       |       | o |
| o  |   | o o o |       | o o | o |   | o o o |       | o o |
| o  |   | o o o |       | o o | o |   | o o o |       | o o |
| o  |   | o     |       | o   | o |   |       |       | o |
|    |   | o     |       |     |   |   |       |       |   |
|    | o | o     | o o o |     |   | o | o    | o o o |   |
|    | o o | o   | o o o |     |   | o o | o  | o o o |   |
|    | o   | o o | o o o | o   |   | o   | o o o | o o o | o |
| o o | o | o o | o o o | o | o o | o | o o o | o o o | o |
| 8 0 | 0 | 2 4 2 | 0 0 0 | 7 4 | 8 0 | 0 | 2 2 2 | 0 0 0 | 7 4 |

The first digit of the quotient has been thus subtracted from the dividend completely, in other words, by subtracting from the dividend the product of the first digit of the quotient and all digits of the divisor.

For the next digit of the quotient, it will be noted that the digit 7 of the divisor on rod 16 at Q will go into the number 22 on rods 16 at F and E, three times, which entails pushing three counters 15 on rod 16 at U up from the front wall 11 to the reading bar 17, to set the digit three in the quotient section of the abacus. Then subtract 21, three times seven, from rod 16 at E, by pushing two counters 15 on rod 16 at F down from the reading bar 17 to the front wall 11, to subtract the digit 2 of the number 21, and then pushing one counter 15 on rod 16 at E down from the reading bar 17 to the front wall 11 to subtract the digit 1 of the number 21. Then multiply the digit 4 on rod 16 at P by the digit 3 on rod 16 at U and subtract 12 from rod 16 at D by pushing one counter 15 on rod 16 at E down from the reading bar 17 to the front wall 11 to subtract the digit 1 of the number 12, and pushing two counters 15 on rod 16 at D down from the reading bar 17 to the front wall 11, to subtract the digit 2 of the number 12.

| VU | G | FED | CBA | QP | VU | G | FED | CBA | QP | VU | G | FED | CBA | QP |
|----|---|-----|-----|----|----|---|-----|-----|----|----|---|-----|-----|----|
| o  | o | o o o | o o o | o | o | o | o o o | o o o | o | o | o | o o o | o o o | o |
| o  |   |       |       | o | o |   |       |       | o | o |   |       |       | o |
| o o |   | o o o |       | o o | o o |   | o o  |       | o o | o o |   |       |       | o o |
| o o |   | o o o |       | o o | o o |   | o    |       | o o | o o |   |       |       | o o |
| o o |   |       |       | o   | o o |   |      |       | o  | o o |   |       |       | o |
|    |   |       |       |     |     |   |      |       | o  |    |   |       |       | o |
|    | o |       | o o o |     |    | o | o    | o o o |    |    | o | o o o | o o o |   |
|    | o |       | o o o |     |    | o o |    | o o o |    |    | o | o o o | o o o |   |
|    | o | o o o | o o o | o  |    | o | o o o | o o o | o |    | o | o o o | o o o | o |
| o o | o | o o o | o o o | o | o o | o | o o o | o o o | o | o o | o | o o o | o o o | o |
| 8 3 | 0 | 2 2 2 | 0 0 0 | 7 4 | 8 3 | 0 | 0 1 2 | 0 0 0 | 7 4 | 8 3 | 0 | 0 0 0 | 0 0 0 | 7 4 |

It will be noted that after subtraction of the digit 2 of the number 12, the dividend shows zero, and the correct answer 83 is shown in the quotient section, while the divisor 74 remains on the rods 16 at Q and P.

It will also be noted that proof of the correct quotient as shown could be obtained without disturbing the digits in the quotient and divisor, by simply multiplying the quotient by the divisor and setting the product on rods 16 between A and O, and thus producing the same dividend as was originally set on the abacus.

It will also be noted that if there was a remainder after the digit 2 of the number 12 was subtracted from the dividend, by use of the zero on rod 16 at C, the first digit of the decimal fraction in the quotient would be set on rod 16 at O, the second digit of the decimal fraction on the rod 16 at N, and so on, thus providing adequately for decimal fractions in the quotient. Larger numbers may be divided as accurately and as easily as those illustrated above.

To further facilitate rapid and accurate operation of the abacus the spaces between the reading bar and the sides of the box are shown of such length that any counter or group of counters visibly sets itself off from any counter or counters standing at zero.

Preferably the four counters on any rod occupy only about one-half of the free length of rod, so that each group of four standing at zero is spaced from the reading bar by more than the thickness of three counters, and each single counter on the opposite side of the reading bar occupies about one-third or less of the free rod.

In this way, it is possible to develop subconscious recognizing of digits set on the present invention, as instantaneous as a musician recognizes written notes of music on a music scale, and to move counter in calculating on the present invention as subconsciously spontaneous as written notes of music are interpreted on a musical instrument.

Having thus described one form of the invention, what is claimed is:

1. In an abacus a reading bar, spaced rods denoting decimal places passing through said bar at spaced intervals, a counter on each rod slidable to denote five units, a frame for said abacus including a side supporting one end of each rod and spaced from the reading bar by more than the thickness of two counters, a group of four counters on each rod on the opposite side of the reading bar, and a side supporting the other end of each rod to and from which each counter of said group is slidable to divide one unit and spaced from the reading bar by more than the thickness of three of said counters, said rods including counters of contrasting color on rods separated by wider spaces at thousands and millions and suitable for addition and others of said rods adjacent to said sides consisting of counters of another color and in groups for multiplication and division and said groups also separated by wider spaces from the rods for addition.

2. In an abacus a reading bar, spaced rods denoting decimal places passing through said bar at spaced intervals, and spaced more widely at thousands and millions and further spaced into separate groups for addition and multiplication, a slidable counter on each rod, a frame for said abacus including a side supporting one end of each rod to and from which said counter is slidable to denote five units, four counters on each rod on the opposite side of the reading bar, a side supporting the other end of each rod to and from which each counter is slidable to denote one unit, a bottom on said frame, and a chart beneath said rods and lying on said bottom and divided off to point out rods of the different decimal denominations and as spaced at thousands and millions and as groups for addition in one set of colors, and in groups for multiplication and division differently marked in the groups overlying said chart.

3. An abacus including at least 20 rods, four unit counters on each rod, one five unit counter on each rod, one group of said rods consisting of adding rods subdivided into at least three rods of one color, and three rods of another color, a group of more than three rods lying outside of the adding rods at each side thereof and carrying counters marked differently from the adding groups, serving as division and multiplication rods, a shallow box holding said rods by their ends, a bottom for said box, and a chart under the rods carrying printed indices for each group of rods.

References Cited in the file of this patent

UNITED STATES PATENTS

| 232,482 | Fitch | Sept. 21, 1880 |
| 1,863,927 | Konno | June 21, 1932 |

FOREIGN PATENTS

| 1,711 | Germany | July 3, 1877 |
| 19,456 | Great Britain | Nov. 9, 1901 |